(12) United States Patent
Mechtel et al.

(10) Patent No.: US 6,599,635 B1
(45) Date of Patent: Jul. 29, 2003

(54) INORGANIC COATING COMPOSITION, A METHOD FOR PRODUCING SAME AND THE USE THEREOF

(75) Inventors: Markus Mechtel, Köln (DE); Wolfgang Pütz, Hünxe (DE); Lutz Schmalstieg, Köln (DE); Holger Mundstock, Wermelskirchen (DE); Michael Sonntag, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/049,920

(22) PCT Filed: Aug. 8, 2000

(86) PCT No.: PCT/EP00/07670

§ 371 (c)(1), (2), (4) Date: Feb. 19, 2002

(87) PCT Pub. No.: WO01/14493

PCT Pub. Date: Mar. 1, 2001

(51) Int. Cl.$^7$ .................. B32B 9/08
(52) U.S. Cl. ............ 428/449; 524/379; 524/588; 528/35; 528/37
(58) Field of Search ............ 428/447; 528/35, 528/37; 524/588, 379

(56) References Cited

U.S. PATENT DOCUMENTS

| | | | |
|---|---|---|---|
| 3,986,997 A | 10/1976 | Clark | 260/29.2 M |
| 4,027,073 A | 5/1977 | Clark | 428/412 |
| 4,324,712 A | 4/1982 | Vaughn, Jr. | 524/767 |
| 4,624,870 A | 11/1986 | Anthony | 427/387 |
| 4,871,827 A * | 10/1989 | Klosowski et al. | 528/17 |
| 5,202,404 A * | 4/1993 | Takarada et al. | 528/34 |
| 5,468,829 A * | 11/1995 | Bergstrom et al. | 528/18 |
| 5,548,051 A | 8/1996 | Michalczyk et al. | 528/15 |
| 5,644,014 A | 7/1997 | Schmidt et al. | 528/43 |
| 6,136,939 A | 10/2000 | Mager et al. | 528/33 |
| 6,413,446 B1 * | 7/2002 | Mechtel et al. | 252/181 |

FOREIGN PATENT DOCUMENTS

| | | |
|---|---|---|
| EP | 0 358 011 | 12/1995 |
| EP | 743 313 | 11/1996 |
| EP | 744 443 | 11/1996 |
| EP | 787 734 | 8/1997 |
| WO | 99/03941 | 1/1999 |

* cited by examiner

Primary Examiner—Robert Dawson
Assistant Examiner—Marc S Zimmer
(74) Attorney, Agent, or Firm—Joseph C. Gil; Thomas W. Roy

(57) ABSTRACT

The present invention relates to inorganic coating compositions based on cyclic carbosiloxanes, inorganic polycondensates and α,ω-functional linear oligosiloxanes, and also to a process for production thereof and to the use thereof and to a non-stick layer so obtained.

12 Claims, No Drawings

INORGANIC COATING COMPOSITION, A METHOD FOR PRODUCING SAME AND THE USE THEREOF

BACKGROUND OF THE INVENTION

The present invention relates to inorganic coating compositions based on cyclic carbosiloxanes, inorganic polycondensates and α,ω-functional linear oligosiloxanes, and also to a process for production thereof and to the use thereof and to a non-stick coating so obtained.

Inorganic coatings based on siloxane have been state of the art for a long time and are valued in many fields on account of their properties. Silicone-resin lacquers, which are substantially composed of randomly distributed T, D and M units and, in part, also of Q units, are produced from the corresponding chlorosilanes with the aid of direct or indirect hydrolysis. The step of hydrolysis of the silanes to form oligosiloxanes is followed by the step of condensation to form organopolysiloxane resins, so-called "bodying". The production processes are described, for example, in W. Noll, Chemie und Technologie der Silicone, VCH-Verlag, 1968 and in Chemie in Unserer Zeit, 23, (1989), 86–99. The technology and properties of silicone resins are also summarised therein. Hard, mechanically loadable though brittle coatings can be produced, in particular, with pure methylsilicone resins. In order to obtain the final properties, silicone-resin lacquers have to be baked at temperatures from 180 to 230° C.

In contrast with the production of silicone resin, in the case of the sol-gel process an oligosiloxane sol is produced by hydrolysis and polycondensation of alkoxysilanes without subsequent "bodying". In comparison with silicone resins, the sols have a much larger number of reactive SiOH or SiOR groups and possess a higher crosslinkage density by virtue of a higher proportion of Q units. Sol-gel coating systems have the known positive properties of the silicon resins, such as high thermal stability, resistance to solvents and to many liquids in daily use, non-stick action and resistance to weathering. By reason of their higher reactivity and crosslinkage density, sol-gel coatings can be cured at lower temperatures from about 80° C. to about 130° C., and they surpass silicone-resin lacquers in hardness and mechanical stability.

The disadvantage of condensation-crosslinking sol-gel coating systems is their lower solids content or, to be more exact, their high VOC content. The solids content of sol-gel lacquers lies, as a rule, between 10 and 50 wt. %, generally around a maximum of 30 wt. %. However, the reduction of volatile organic compounds (VOC) is being demanded to an increasing extent by the coating industry. A further disadvantage of the existing sol-gel coating systems is their tendency to crack by reason of low flexibility. They can therefore only be applied in slight layer thicknesses of a few μm. In addition, for many applications, such as for example for providing protection against graffiti on buildings, large vehicles and rail vehicles, it would be advantageous if inorganic sol-gel systems obtained their properties already in the course of curing at room temperature.

A demand therefore exists for inorganic sol-gel systems without the disadvantages stated above but with the stated advantages.

The state of the art consists in varying the flexibility and hardness of sol-gel lacquers within certain limits via the type and the quantitative ratios of the silanes and additives that are employed for producing the coating composition. In U.S. Pat. No. 4,624,870 methyltrialkoxysilane is hydrolysed with colloidal $SiO_2$. The properties are controlled via the ratio of $CH_3SiO_{3/2}$ units to $SiO_2$ units. U.S. Pat. Nos. 3,986,997, 4,027,073 and EP-A 358 011 describe the (co)hydrolysis of organofunctional alkyltrialkoxysilanes such as methyltrialkoxysilane, glycidyloxypropyltrialkoxysilane or methacryloxypropyltrialkoxysilane and tetraethoxysilane (TEOS) as well as, optionally, inorganic nanoparticles. With these systems the properties can be controlled via the type and proportion of the organofunctional silanes with respect to the overall composition. In U.S. Pat. No. 4,324,712 the tendency of the coating composition to crack is reduced by addition of 0.5 to 5% of a linear functional oligosiloxane to the (co)hydrolysate formed from alkyltrialkoxysilane and colloidal $SiO_2$. In PCT patents 8/52992 and 94/06807 multifunctional, preferably cyclic, organosiloxanes are employed for the modification of inorganic coatings.

Also state of the art is the hydrophobic and/or oleophobic modification of the previously described coating compositions by addition of fluorine-containing components, fluorine-containing alkoxysilanes being preferred. Such coatings are distinguished by good non-stick properties and are described, for example, in DE-A 41 18 184 and in WO 99/03941.

However, all the condensation-crosslinking sol-gel systems known in accordance with the state of the art exhibit at least one of the disadvantages stated at the outset, ruling out extended use in many fields.

The object of the present invention was therefore to make available an inorganic solgel coating that does not exhibit the disadvantages described previously. A further object of the invention consisted in making available a suitable process for production of the coating composition according to the invention.

The invention is based on the surprising observation that coating compositions that achieve the object underlying the invention can be obtained through the combination of cyclic carbosilanes and/or carbosiloxanes, inorganic polycondensates and α,ω-functional linear oligosiloxanes.

SUMMARY OF THE INVENTION

The invention consequently provides coating compositions containing

I) a multifunctional carbosilane and/or carbosiloxane of the general formula (I)

and/or the (partial) condensation product thereof with
$R^1$ $C_1$–$C_{18}$ alkyl and/or $C_6$–$C_{20}$ aryl, where $R^1$ within the molecule may be the same or different,
X a residue selected from the group consisting of OH, $C_1$–$C_4$ alkoxy, $C_6$–$C_{20}$ aryloxy, $C_1$–$C_6$ acyloxy, preferably OH, methoxy or ethoxy,
n 0 to 2
m 2 to 6
p integer $\geq 2$ and
W either a linear, cyclic or branched silane or siloxane, II) a polycondensation product of one or more hydrolysable compounds of the general formula (II)

with
M Si, B, Al, Ti, Zr, V, Zn, preferably Si
$R^2$ the same or different non-hydrolysable $C_1$–$C_{14}$ alkyl residues or $C_6$–$C_{20}$ aryl residues, which may be replaced by at least one member of the group consisting of O, N, S, P, Y a hydrolysable group, preferably $C_1$–$C_8$ alkoxy or $C_2$–$C_8$ acyloxy, $C_1$–$C_2$ alkoxy being quite particularly preferred, a 0 to 3, preferably 0 or 1 b 1 to 4, where a+b is equal to 3 or 4 and a solids content of at least 40 wt. %, preferably of at least 50 wt. %, in an OH-functional solvent, (III) an α,ω-functional linear oligosiloxane of the general formula (III)

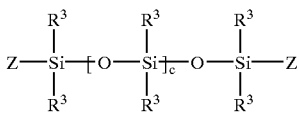
(III)

with

Z hydroxy or $C_1$–$C_4$ alkoxy $R^3$ $C_1$–$C_{18}$ alkyl or alkenyl, where $R^3$ within the molecule may be the same or different, c 1 to 60, preferably 3 to 25, IV) catalysts selected from the group consisting of the acidic, basic or metallic catalysts, preferably from the group consisting of the acids such as hydrochloric acid, sulfuric acid, p-toluenesulfonic acid, trifluoroacetic acid, trifluoromethanesulfonic acid, acetic acid or formic acid, as well as, optionally, V) inorganic fillers and/or inorganic nanoparticles, as well as VI) conventional auxiliary substances pertaining to coating technology.

DETAILED DESCRIPTION OF THE INVENTION

The coating composition according to the invention exhibits a solvent content of at most 50 wt. %, preferably of at most 40 wt. %. It can be applied in flawless manner in dry-layer thicknesses of clearly more than 30 μm and cures at room temperature. The cured films are transparent and flexible. They are hydrophobic and possess good non-stick properties.

Suitable multifunctional carbosilanes and/or carbosiloxanes of the general formula (I) in the sense of the invention are silanes of the general formula (IV)

(IV)

or the (partial) condensation product thereof, with $R^1$ $C_1$–$C_{18}$ alkyl and/or $C_6$–$C_{20}$ aryl, where $R^1$ within the molecule may be the same or different, $R^4$ $C_1$–$C_{18}$ alkyl and/or $C_6$–$C_{20}$ aryl, X a residue selected from the group consisting of OH, $C_1$–$C_4$ alkoxy, $C_6$–$C_{20}$ aryloxy, $C_1$–$C_6$ acyloxy, preferably OH, methoxy or ethoxy, m 2 to 6 n 0 to 2 and p 4, 3 or 2.

In another embodiment of the invention, multifunctional carbosilanes and/or carbosiloxanes of the general formula (I) are siloxanes in which W is composed of at least two structural units selected from monofunctional units M or difunctional units D as well as, to a small extent in addition, trifunctional units T or tetrafunctional units Q and/or the condensation products and/or (partial) condensation products thereof.

The siloxanes according to the invention preferably exhibit a molecular weight (number average) between 300 and 5,000.

In a preferred embodiment of the invention the multifunctional carbosilane and/or carbosiloxane of the general formula (I) is a cyclic siloxane of the general formula (V)

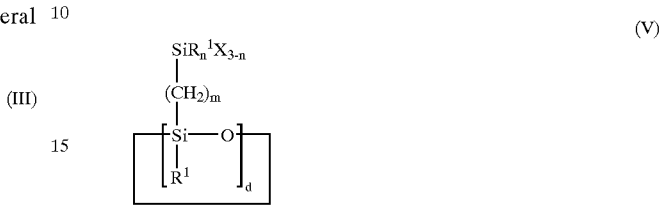
(V)

and/or the (partial) condensation product thereof with $R^1$ $C_1$–$C_{18}$ alkyl and/or $C_6$–$C_{20}$ aryl, where $R^1$ within the molecule may be the same or different, X a residue selected from the group consisting of OH, $C_1$–$C_4$ alkoxy, $C_6$–$C_{20}$ aryloxy, $C_1$–$C_6$ acyloxy, preferably OH, methoxy or ethoxy, d 3 to 6, preferably 4 n 0 to 2 m 2 to 6.

In a particularly preferred embodiment of the coating composition according to the invention the multifunctional carbosilane and/or carbosiloxane is a compound of the formula (VI) and/or (VII) or the (partial) condensation product thereof.

(VI)

and/or

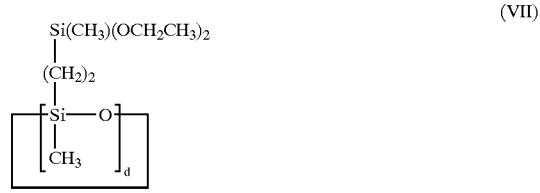
(VII)

with d equal to 3, 4, 5 or 6, preferably 4.

Condensation products and (partial) condensation products are to be understood to mean oligomers or polymers that are formed from at least two molecules of the general formula (I), optionally after hydrolysis and subsequent condensation of the group X, accompanied by formation of a Si—O—Si bond.

Several multifunctional carbosilanes and/or carbosiloxanes of the general formula (I) may also be contained in the coating composition according to the invention.

Hydrolysable compounds of the general formula (II) are preferably alkoxysilanes $R^2{}_a Si(Y)_{(b)}$ (with a preferably 0 or 1 and where $R^2$, Y have the meaning stated previously in connection with formula (II)) or mixtures thereof. Particularly preferred alkoxysilanes are tetraethoxysilane, methyltriethoxysilane and/or phenyltriethoxysilane.

Preferred α,ω-functional linear oligosiloxanes of the general formula (III) are hydroxy-terminated polydimethyl siloxanes, those having an OH content from 0.8 to 9 being particularly preferred.

The present invention likewise provides polycondensation products formed from hydrolysable compounds of the general formula (II) and an α,ω-functional linear oligosiloxane of the general formula (III). In this case, alkoxysilanes $R^2_a Si(Y)_{(b)}$ (with a preferably 0 or 1 and where $R^2$, Y have the meaning specified previously in connection with formula (II)) or mixtures thereof are preferably employed as hydrolysable compounds of the general formula (II), tetraethoxysilane being particularly preferred. It is also possible to incorporate only a part of the α,ω-functional linear oligosiloxane contained in the coating composition into the polycondensation product and to add the remaining portion as a separate component.

The polycondensation products contained in the coating composition according to the invention exhibit a solids content of at least 40 wt. %, preferably of at least 50 wt. %. By way of solvent, OH-functional solvents with a boiling-point higher than 110° C. and a flash-point of at least 30° C. are preferred. Suitable solvents are, for example, 1-butanol, 1-pentanol, 2-pentanol, 1-methoxy-2-propanol or diacetone alcohol.

By way of catalysts, use may be made of all condensation catalysts known in silicone chemistry, such as are described, for example, in W. Noll, Chemie und Technologie der Silicone, VCH-Verlag, Weinheim, 1968. Suitable catalysts are, for example, organic metallic compounds such as salts of carboxylic acid, alcoholates and phenolates, complex compounds of chelate character, basic catalysts such as alkali hydroxides, amines, alkali silanolates, quaternary ammonium hydroxides and acidic catalysts. Acidic catalysts may be Lewis acids or protonic acids such as hydrochloric acid, sulfuric acid, p-toluenesulfonic acid, trifluoroacetic acid, trifluoromethanesulfonic acid, acetic acid or formic acid. The catalyst is preferably an acid, para-toluenesulfonic acid being particularly preferred. The catalyst may also be employed in the form of a solution, preferably in the same solvent that is already contained in the composition.

Further components may also be admixed to the coating composition according to the invention. For example, inorganic fillers or inorganic nanoparticles may be added by way of component (V). To a person skilled in the art it is known that as a result of the addition of inorganic nanoparticles such as, for example, metallic or semimetallic oxides or hydrated oxides of the elements Si, Al or Ti the mechanical properties of coatings are improved. Conventional auxiliary substances pertaining to coating technology may also be added by way of component (VI). Conventional auxiliary substances are all the added substances that are known for producing lacquers and paints, such as, for example, inorganic and/or organic pigments, lacquer additives such as dispersing agents, flow-control agents, thickening agents, defoaming agents and other auxiliaries, adhesive agents, fungicides, bactericides, stabilisers or inhibitors. When using the coating composition according to the invention as, for example, a non-stick coating for protection against marine fouling, customary auxiliaries also include the release or slip additives known from the prior art. These are usually hydrophobic, non-functional additives which diffuse to the boundary surface of the coating during its service life and reduce its surface tension. Suitable release or slip additives are for example silicone oils, organic oils, waxes, paraffins or paraffin jellies. It is of course also possible to add a mixture of the aforementioned components.

In a preferred embodiment of the invention the coating composition according to the invention contains I. 20 to 70 wt. % of a multifunctional carbosilane and/or carbosiloxane of the general formula (I), preferably a compound of the formula (V) and/or (VI) or the (partial) condensation products thereof, II. 10 to 70 wt. % of a polycondensation product of one or more hydrolysable compounds of the general formula (II), preferably of at least one hydrolysable Si compound, particularly preferably tetraethoxysilane, and/or methyltriethoxysilane and/or phenyltriethoxysilane with a solids content of at least 40 wt. %, preferably of at least 50 wt. %, in an OH-functional solvent, whereby the polycondensation product may also contain α,ω-functional linear oligosiloxanes, III. 5 to 50 wt. % of an α,ω-functional linear oligosiloxane of the general formula (III), whereby the latter may be wholly or partially contained in the polycondensation product formed from one or more hydrolysable compounds of the general formula (II), IV. 0.5 to 20 wt. % of a catalyst solution, preferably para-toluenesulfonic acid, dissolved in an organic solvent, with the proviso that components (I) to (IV) add up to 100 wt. %, as well as, optionally, V. inorganic fillers and/or inorganic nanoparticles as well as VI. conventional auxiliary substances pertaining to coating technology in the quantities that are conventional in coating technology. The expression "quantities that are conventional in coating technology" is to be understood to mean a ratio of components (V) and (VI) to components (I) to (IV) of no more than 1:1.

An advantage of the coating composition according to the invention is that the components (I) to (IV) at least contained in the coating composition are miscible with one another in any arbitrary ratio within the limits according to the invention. The properties of the coatings that can be produced from the coating composition can consequently be adapted to the particular requirements in simple manner by varying the individual components. By increasing the proportion of α,ω-functional linear oligosiloxane, the flexibility and the hydrophobicity can be raised. An increased proportion with respect to polycondensation products of hydrolysable compounds of the general formula (II) improves the mechanical properties of the coating.

Since components (I), (II) and (III) of the coating composition contain hydrolysable and condensable groups, the components in the fully cured coating differ in their structure and in their percentage proportion from the coating composition employed for production of the coating.

The invention further provides a process for production of the coating composition according to the invention, characterised in that in the first process step a polycondensation product formed from hydrolysable compounds of the general formula (II) and optionally α,ω-functional linear oligosiloxane of the general formula (III) in an OH-functional solvent having a solids content of at least 40 wt. %, preferably of at least 50 wt. %, is produced by means of a gel-sol process, and in a second process step the polycondensation product produced in the first process step from component (II) and optionally (III) is homogeneously stirred together with the components (I), optionally (III) and (IV) as well as the other components (V) and (VI).

Multifunctional carbosilanes and/or carbosiloxanes of the general formula (I), in which W is composed of at least two units selected from monofunctional units M or difunctional units D as well as to a minor extent additionally trifunctional units T or tetrafunctional units Q and/or condensation and/or (partial) condensation products thereof can generally be obtained via two synthetic routes. In one synthetic route hydrogen-functional silanes or siloxanes are used as the starting compound W. In the other route vinyl-functional silanes or siloxanes are used as the starting compound W. Suitable hydrogen- or vinyl-functional silanes and siloxanes are commercially available or can be produced from the suitable silanes or siloxanes by direct or indirect hydrolysis or equilibration processes known in silicone technology. In the case of a hydrogen-functional starting compound W the $[(CH_2)_m SiR^1_n X_{(3-n)}]$ group according to the general formula (I) is added to W as a corresponding alkenyl-functional silane using platinum catalysis. If a vinyl-functional silane or siloxane is used as the starting compound W a corresponding hydrogen silane is used. If necessary, the radical X can then be introduced in a subsequent process step by direct or indirect hydrolysis known to the skilled man. The synthetic principle is explained in more detail in EP-A 866086, WO 94/06 807 and DE-A 196 03 241.

The production of multifunctional carbosilanes of the general formula (IV) is described in EP-A 743 313, for example; multifunctional carbosiloxanes of the formula (V) and (VI) are preferably obtainable in accordance with the processes described in EP-A 866 086, DE-A 196 03 241 and WO/98/52992.

The production, according to the invention, of the polycondensation product formed from hydrolysable compounds of the general formula (II) is effected in such a manner that, in the first process step, the hydrolysable compounds of the general formula (II) are hydrolysed and condensed by addition of water, and catalyst as well as, optionally, solvent in the manner that is conventional in sol-gel technology. For the hydrolysis it is particularly advantageous if the molar ratio of added water to hydrolysable groups Y lies within the range from 0.3:1 to 0.7:1, preferably within the range from 0.45:1 to 0.55:1. By way of catalyst, preferably between 250 and 1,000 ppm of an acid are admixed, relative to the reaction mixture. After completion of the reaction the polycondensation product is neutralised with a base, and an OH-functional solvent with a boiling-point higher than 110° C. and a flash-point of at least 30° C. is added. Suitable solvents are, for example, 1-butanol, 1-pentanol, 2-pentanol, 1-methoxy-2-propanol or diacetone alcohol. Then distillation is carried out up to the required solids content of at least 40% by weight, preferably at least 50% by weight. The salt that has arisen as a result of neutralisation is filtered off.

Another embodiment of the process according to the invention is the production of a polycondensation product from, preferably, alkoxysilanes $R^2_a Si(Y)_{(b)}$ (with a preferably 0 or 1, and where $R^2$, Y have the meaning stated previously in connection with formula (II)) or mixtures thereof, particularly preferably from tetraethoxysilane and an α,ω-functional linear oligosiloxane. The complete quantity or only a part of the α,ω-functional linear oligosiloxane contained in the coating composition may be employed in the course of production of the polycondensation product. It is advantageous to dilute the mixture of alkoxysilanes $R^2_a Si(Y)_{(b)}$ and α,ω-functional linear oligosiloxane with a solvent, preferably with ethanol. Hydrolysis and condensation are effected in the manner that is conventional in sol-gel technology. However, it has proved to be advantageous if, after neutralisation and addition of the higher-boiling solvent, further stirring is effected for at least 60 minutes, preferably at elevated temperature. No change in the remaining parameters of the process or in the processing of the product occurs as a result of the addition of α,ω-functional linear oligosiloxane.

Surprisingly, the polycondensation products that are produced by the process according to the invention from the preferred alkoxysilanes $R^2_a Si(Y)_{(b)}$ and optionally α,ω-functional linear oligosiloxane are clear solutions or dispersions, despite the high solids content of at least 40 wt. %, preferably of at least 50 wt. %, and are storable at room temperature over a period of several months.

In the process according to the invention the components contained in the coating composition can be stirred together with one another immediately prior to application. In a preferred embodiment of the process according to the invention a 2-component formulation that is stable in storage can be produced from components (I) to (IV) according to the invention as well as, optionally, further components (V) and/or (VI). In this case it is preferred if the multifunctional carbosilane and/or carbosiloxane of the general formula (I) is a cyclic siloxane of the general formula (V) in which X is a methoxy or ethoxy residue. For example, a mixture can be produced from components (I), (II) and (III) which is stable in storage and into which, prior to application, component (IV) is worked by means of methods that are conventional in coating technology.

The invention further provides the use of the coating composition according to the invention for the production of coatings on inorganic or organic materials or objects.

The invention likewise provides non-stick layers that are obtained by application of the coating composition according to the invention onto inorganic or organic materials or objects in order to protect the latter effectively against dirt, graffiti or marine vegetation.

Surfaces, such as for example those of buildings, large vehicles and rail vehicles, can be provided with effective and lasting protection, so that they can be freed from graffiti by simple means without any residues remaining on the underlying surface and without any damage to the latter. On painted surfaces, such as for example those of underground trains or trams or local trains the coating composition according to the invention can be applied to the topcoat as an additional protective layer. In the case of absorbent underlying mineral surfaces, such as for example is frequently the case with buildings, it may be advantageous to apply a suitable intermediate layer. Suitable intermediate layers are for example the aqueous 2-component polyurethane binders described according to the teaching of DE-A 197 15 427.

Since the coating composition cures already at room temperature, materials or objects can also be coated that cannot or must not be exposed to an elevated temperature. This is the case, for example, with the use of the coating composition according to the invention as an anti-fouling coating or with its use as an anti-graffiti coating that has not been applied at the factory. But the coating may also be cured in accelerated manner at elevated temperature. When the coating composition applied has hardened, the surface to be protected is highly hydrophobic and has effective non-stick properties. As a result, not only do the graffiti not adhere at all or only very poorly to the underlying surface, thus reducing their attractiveness to paint-sprayers, but they can also be removed in a residue-free manner both by graffiti-removing agents and with water using a high-pressure cleaning device. The surfaces coated with the coating compositions according to the invention are also effectively protected against damage from solvents, thereby prolonging the intervals between maintenance work. By reason of the low solvent content in comparison with the state of the art, the coating composition may also be used in many fields in which VOC guidelines restrict the solvent content. Application of the coating composition according to the invention may be effected by the conventional methods, such as spraying, brushing, dipping, flow coating, spin coating or blade coating.

EXAMPLES

An ethoxy-functional siloxane that was produced in a manner analogous to Example 2 of PCT/98/52992 is employed by way of multifunctional carbosiloxane.

Example 1

1,000 g (4.8 mol) tetraethoxysilane, dissolved in 400 g ethanol, are hydrolysed and precondensed after addition of 810 ppm HCl and 173 g (9.6 mol) $H_2O$. The reaction mixture, which is cloudy at first, heats up within a few minutes from room temperature to about 65° C. and becomes clear. The mixture is allowed to cool, with stirring, to room temperature, the added acid is neutralised, and 400 g n-butanol are added. At reduced pressure, solvent is distilled off up to 70° C. After filtration the polycondensation product accumulates in the form of clear liquid with a solids content of 64.5 wt. %. For further use, a solids content of 50 wt. % is adjusted with butanol. The polycondensation product is storable at room temperature for a period of several months.

Example 2

Same procedure as in Example 1, with the difference that n-pentanol is added after neutralisation. The solids content of the clear polycondensation product amounts to 48 wt. %. The polycondensation product is storable at room temperature for a period of several months.

Example 3

Same procedure as in Example 1, with the difference that a mixture of 1,000 g (4.8 mol) tetraethoxysilane and 85.7 g (0.48 mol) methyltriethoxysilane is hydrolysed with 186 g (10.33 mol) $H_2O$.

Example 4

Same procedure as in Example 1, with the difference that a mixture of 1,000 g (4.8 mol) tetraethoxysilane and 68.5 g (0.385 mol) methyltriethoxysilane and 23.12 g (0.096 mol) phenyltriethoxysilane is hydrolysed with 186 g (10.33 mol) $H_2O$.

Example 5

A mixture of 1,000 g (4.8 mol) tetraethoxysilane and 480 g of an α,ω-hydroxy-functional polydimethyl siloxane with an OH content of about 7.5% is dissolved in 400 g ethanol and hydrolysed and precondensed by addition of 620 ppm HCl and 173 g (9.6 mol) $H_2O$. The reaction mixture, which is cloudy at first, heats up within a few minutes from room temperature to about 65° C. The mixture is allowed to cool, with stirring, to room temperature, the added acid is neutralised, 760 g n-butanol are added, and stirring is effected for another hour at 70° C. At reduced pressure, solvent is distilled off up to 70° C. After filtration the polycondensation product accumulates in the form of clear liquid with a solids content of 50.7 wt. %. The polycondensation product is storable at room temperature for a period of several months.

Comparative Example 1

(Hydrolysate containing an α,ω-hydroxyfunctional polydimethylsiloxane with an OH content not according to the invention)

Same procedure as in Example 5. Instead of the α,ω-hydroxy-functional polydimethyl siloxane with an OH content of about 7.5%, the same quantity of an α,ω-hydroxy-functional polydimethyl siloxane with an OH content of about 0.2% was employed. Upon distilling off the solvent the reaction mixture forms a gel and solidifies.

Coating Compositions According to the Invention

Example 6

With stirring, 63.3 wt. % of the ethoxy-functional siloxane produced in accordance with Example 2 in WO/98/52992 are mixed with 12.7 wt. % polycondensation product from Example 1, 12.7 wt. % of an α,ω-hydroxy-functional polydimethyl siloxane with an OH content of about 7.5% and 11.3 wt. % of an approx. 2-% solution of para-toluenesulfonic acid in n-butanol. The mixture has a solvent content of 18 wt. % and a solids content of 61 wt. %. It is applied onto a glass plate with a doctor blade in a layer thickness of 100 μm and dried at room temperature for 24 hours. The coating is clear. The coating is not wetted by a permanent marker produced by Edding (Edding 850). 24 hours after application the marker can be removed with a cloth without the aid of cleaning agent.

Example 7

The same procedure is used as in Example 6, except that 53.2 wt. % of the ethoxy-functional siloxane, 12.8 wt. % of a polycondensation product of Example 1, 10.6 wt. % of an α,ω-hydroxy-functional polydimethylsiloxane with an OH content of about 7.5%, 1.0 wt. % of 3-mercaptopropyltriethoxysilane, 0.3 wt. % of Byk 306, 3.2 wt. % of n-butanol and 18.9 wt. % of an approx. 2% solution of para-toluenesulfonic acid in 2-ethylhexanol are mixed together. The mixture has a solids content of 54 wt. %.

Example 8

Same procedure as in Example 6. However, 53.7 wt. % of the ethoxy-functional siloxane, 40.3 wt. % polycondensation product from Example 5 and 6 wt. % of an approx. 2-% solution of para-toluenesulfonic acid in n-butanol are mixed with one another. The coating is clear. The mixture has a solvent content of 26 wt. % and a solids content of 55.5 wt. %. The coating is not wetted by a permanent marker produced by Edding (Edding 850). 24 hours after application the marker can be removed with a cloth without the aid of cleaning agent.

Example 9

Same procedure as in Example 6. However, 57.4 wt. % of the ethoxy-functional siloxane, 30.9 wt. % polycondensation product from Example 5 and 11.7 wt. % of an approx. 2-% solution of para-toluenesulfonic acid in n-butanol are mixed with one another. The coating is clear. The mixture has a solvent content of 27 wt. % and a solids content of 53.3 wt. %. The coating is not wetted by a permanent marker produced by Edding (Edding 850). 24 hours after application the marker can be removed with a cloth without the aid of cleaning agent.

Example 10

Same procedure as in Example 6. However, 22.5 wt. % of the ethoxy-functional siloxane, 67.4 wt. % polycondensation product from Example 5 and 10.1 wt. % of an approx. 2-% solution of para-toluenesulfonic acid in n-butanol are mixed with one another. The coating is clear. The mixture has a solvent content of 44 wt. % and a solids content of 49 wt. %. The coating is not wetted by a permanent marker produced by Edding (Edding 850). 24 hours after application the marker can be removed with a cloth without the aid of cleaning agent.

Example 11

The same procedure is used as in Example 6, except that 48.2% by weight of the ethoxy-functional siloxane, 11.6% by weight of the polycondensation product from Example 5, 38.6% by weight of an α,ω-hydroxyfunctional polydimethylsiloxane having an OH content of approx. 7.5% and 1.6% by weight of an approx. 2% solution of para-toluenesulphonic acid in n-butanol are mixed together. The mixture has a solvent content of 7.5% by weight and a solids content of 76% by weight. The coating is transparent. A permanent marker from Edding (Edding 850) does not adhere to the coating. The marker can be removed with a cloth 24 hours after its application without the use of any cleansing agent.

Comparative Example 2
(Coating Composition not Containing α,ω-hydroxyfunctional Polydimethylsiloxane)

Same procedure as in Example 6. However, 30,8 wt. % of the ethoxy-functional siloxane, 55.4 wt. % polycondensation product from Example 1 and 13.8 wt. % of an approx. 2-% solution of para-toluenesulfonic acid in n-butanol are mixed with one another. The mixture has a solvent content of 41.5 wt. % and a solids content of 48 wt. %. 24 hours after application the marker leaves distinct shadows behind.

Comparative Example 3
(Coating Composition Containing an α,ω-hydroxyfunctional Polydimethylsiloxane with an OH Content not According to the Invention)

The same procedure is used as in Example 6, except that, instead of an α,ω-hydroxyfunctional polydimethylsiloxane with an OH content of approx. 7.5% the same quantity of an α,ω-hydroxyfunctional polydimethylsiloxane with an OH content of approx. 0.1% is used. The mixture is incompatible.

Comparative Example 4
(Coating Composition not Containing a Multifunctional Carbosilane and/or Carbosiloxane)

20% by weight of the polycondensation product from Example 1, 75% by weight of the polycondensation product from Example 5 and 5.0% by weight of a 2% solution of para-toluenesulphonic acid in n-pentanol are mixed together with stirring. The mixture has a solvent content of 52.5% by weight and a solids content of 47.5% by weight. 24 hours after application considerable crack formation is detected.

Comparative Example 5
(Coating Composition not Containing a Multifunctional Carbosilane and/or Carbosiloxane)

87% by weight of a polycondensation product from Example 1, 4.4% by weight of an α,ω-hydroxyfunctional polydimethylsiloxane with an OH content of approx. 7.5% and 8.6% by weight of a 2% solution of para-toluenesulphonic acid in n-pentanol are mixed together with stirring. The mixture has a solvent content of 52.2% by weight and a solids content of 47.8% by weight. 24 hours after application considerable crack formation is detected.

Coating composition for protecting surfaces against graffiti.

Comparative Example 6

For comparison purposes a high-grade aqueous 2-component polyurethane cover-coat composition employed for coating large vehicles and rail vehicles is used:

| 1. polyol: | 43.3 wt. % of Bayhydrol VPLS 2235/1 |
| 2. polyisocyanate: | 13.3 wt. % of Bayhydur VPLS 2319 |
| 3. pigments: | 13.4 wt. % |
| 4. additives and solvents: | 29.9 wt. % |

Component 1 (Polyol):

A 45% polyacrylate dispersion in water/solventnaphta 100/2-butoxyethanol, which is neutralized with dimethylethanolamine, ratio: about 45.6:4:4:1.4, OH content: 3.3%, based on the solid resin.

Component 2 (Polyisocyanate):

A hydrophilized aliphatic polyisocyanate based on 100% hexamethylene diisocyanate, NCO content 18.0%

Component 3 (Pigments):

1.7 wt. % Irgazine Red BO (Ciba Specialty Chemicals/Basle), 2.5 wt. % Paliogen Orange L 2930 HD (BASF AG/Ludwigshaften), 4.2 wt. % Sicopal Yellow L 1600 (BASF AG/Lugwigshafen), 5.0 wt. % Blancfixe M (Sachtleben Chemie GmbH/Duisburg).

Component 4 (Additives and Solvents):

1.0 wt. % Surfynol 104 in a 50% concentration in butyl glycol (Air Products Nederland BV/Utrecht), 0.1 wt. % Borchigel PW 25 in a 25% concentration in propylene glycol/water (Borchers GmbH/Monheim), 1.0 wt. % Baysilone VPAI 3468:3466 (3:7, in a 10% concentration in butoxyl) (Borchers GmbH/Monheim), 2.0 wt. % Borchigen SN 95 (in a 25% concentration in water) (Borchers GmbH/Monheim), 22.4 wt. % demineralized water, 3.4 wt. % butoxyl.

Example 12

Test of the outflow time in a DIN 4 cup of the ready-to-use coating composition of Example 7.

| period after mixing | aqueous 2-component PU (Comparative Example 6) | coating composition from Example 7 |
| --- | --- | --- |
| 0 h | 26 secs. | 12 secs. |
| 1 h | 31 secs. | 12 secs. |
| 2 h | 34 secs. | 12 secs. |
| 3 h | 40 secs. | 12 secs. |
| 6 h | — | 12 secs. |
| 24 h | — | 13 secs. |

The coating composition of Example 7 has a very long pot life compared with standard coating systems for large vehicles and rail vehicles.

Example 13

Test of the Drying Rate at Room Temperature (DIN 53150)

| degree of drying | aqueous 2-component polyurethane (comparative example 6) | coating composition from Example 7 |
|---|---|---|
| T1 | 1 h | 6 mins. |
| T3 | 7 h | 12 mins. |
| film layer thickness | 40 μm | 30 μm |

Compared with the standard coating systems for large vehicles and rail vehicles the coating composition of Example 7 dries very quickly.

Example 14

The coating compositions formulated according to Example 7 and Comparative Example 6 are applied to glass plates or steel sheets coated with a primer or a single-coloured topcoat composition by pneumatic spraying (through a jet with a diameter of 1.3 mm using a spraying pressure of 3.5 bars).

Resulting Dry Film Layer Thickness:

| | |
|---|---|
| coating composition from Example 7: | approx. 20 μm |
| aqueous 2-component polyurethane cover-coat composition from Comparative Example 6: | approx. 50 μm |

Example 15

Test of the Solvent Resistance of the Coatings Applied in Example 14 (VDA 621–412, Exposure Time: 10 mins)

| solvent | aqueous 2-component polyurethane (Comparative Example 6) | coating composition from Example 7 |
|---|---|---|
| premium gasoline | 2 | 0 |
| xylene | 5 | 3 |
| methoxypropyl acetate | 5 | 2 | rating:
0 = no effect on the coating film
5 = substantial swelling

Compared with the standard coating systems for large vehicles and rail vehicles, the coating composition of Example 7 is capable of effectively preventing the surface to be protected from being damaged by solvents.

Example 16

Test of Anti-graffiti Properties

An alkyd spray coating composition, an acrylic spray coating composition and a felt-tip marking were applied to the substrates coated according to Example 14 and then stored for 48 hours at 50° C. in order to simulate ageing of the graffiti. In order to test for cleanability, Dekontaminol, a commercially available graffiti-removing agent, was applied. After being left to act on the surface for 10 minutes the Dekontaminol is rubbed off with a cloth.

Results:

| substance applied | aqueous 2-component polyurethane (Comparative Example 6) | coating composition from Example 7 |
|---|---|---|
| alkyl spray composition | 4 | 0 |
| acrylic spray composition | 2 | 0 |
| felt-tip marking | 0 | 0 | degree of removal:
0 = completely removed
5 = no effect

Compared with standard coating systems for large vehicles and rail vehicles, surfaces can be effectively and permanent protected by the process according to the invention so that graffiti can be removed by simple means without any residues remaining on the underlying surface and without any damage to the latter. In addition, the process according to the invention has further applicational advantages, such as rapid drying and a long pot life.

What is claimed is:

1. A coating composition comprising
   I) a multifunctional carbosilane and/or carbosiloxane of formula (I) and/or the partial condensation product thereof $$W[(CH_2)_m SiR^1_n X_{(3-n)}]_p \quad (I)$$

wherein
   $R^1$ is the same or different within the molecule and represents $C_1$–$C_{18}$ alkyl or $C_6$–$C_{20}$ aryl,
   X represents OH, $C_1$–$C_4$ alkoxy, $C_6$–$C_{20}$ aryloxy or $C_1$–$C_6$ acyloxy,
   n is 0 to 2
   m is 2 to 6
   p is an integer $\geq 2$ and
   W represents a linear, cyclic or branched silane or siloxane, II) a polycondensation product of one or more hydrolyzable compounds of formula (II)

$$R^2_a M(Y)_{(b)} \quad (II)$$

wherein
   M represents Si, B, Al, Ti, Zr, V or Zn,
   $R^2$ is the same or different and represents a non-hydrolyzable $C_1$–$C_{14}$ alkyl residue or $C_6$–$C_{20}$ aryl residue, which may be replaced by at least one of O, N, S or P,
   Y represents a hydrolysable group,
   a is 0 to 3,
   b is 1 to 4 and
   a+b is equal to 3 or 4,
   and a solids content of at least 40 wt. % in an OH-functional solvent, III) an α,ω-functional linear oligosiloxane of formula (III)

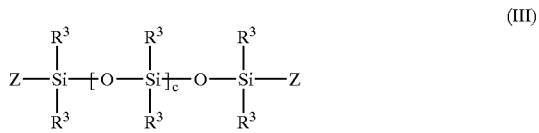

wherein
   Z represents hydroxy or $C_1$–$C_4$ alkoxy

R³ is the same or different within the molecule and represents a $C_1$–$C_{18}$ alkyl or alkenyl and
c is 1 to 60, IV) a catalyst comprising a member selected from the group consisting of acidic, basic and metallic catalysts and V) optionally inorganic fillers and/or inorganic nanoparticles.

2. The coating composition of claim 1 wherein the multifunctional carbosilane and/or carbosiloxane of formula (I) is a cyclic siloxane of formula (V) and or the partial condensation product thereof

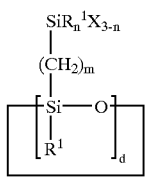

(V)

wherein
d is 3 to 6.

3. The coating composition of claim 1 wherein the multifunctional carbosilane and/or carbosiloxane of formula (I) comprises a compound of formula (VI) and/or (VII) and/or the partial condensation product thereof

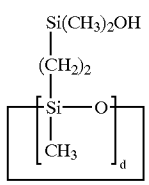

(VI)

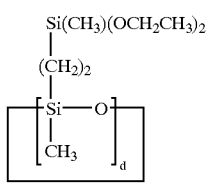

(VII)

wherein
d is 3 to 6.

4. The coating composition of claim 1 wherein M represents silicon and a is 0 or 1.

5. The coating composition of claim 1 wherein the hydrolyzable compounds of formula (II) comprise tetraethoxysilane, methyltriethoxysilane and/or phenyltriethoxysilane.

6. The coating composition of claim 1 wherein the α,ω-functional linear oligosiloxane of formula (III) comprises an α,ω-hydroxy-functional polydimethyl siloxane.

7. The coating composition of claim 1 wherein the α,ω-functional linear oligosiloxane is wholly or partially incorporated into the polycondensation product of one or more hydrolyzable compounds of formula, (II).

8. The coating composition of claim 1 wherein the coating composition comprises

I) 20 to 70 wt. % of a multifunctional carbosilane and/or carbosiloxane of formula (I) or the partial condensation products thereof, II) 10 to 70 wt. % of a polycondensation product of one or more hydrolyzable compounds of formula (II), with a solids content of at least 40 wt. % in an OH-functional solvent, wherein the polycondensation product may also contain α,ω-functional linear oligosiloxanes, III) 5 to 50 wt. % of an α,ω-functional linear oligosiloxane of formula (III), which may be wholly or partially contained in the polycondensation product formed from one or more hydrolyzable compounds of formula (II), IV) 0.5 to 20 wt. % of a catalyst solution dissolved in an organic solvent, wherein components (I) to (IV) add up to 100 wt. %, and V) optionally inorganic fillers and/or inorganic nanoparticles.

9. A process for production of the coating composition of claim 1 which comprises producing in a first process step a polycondensation product formed from a hydrolyzable compound of formula (II) and optionally a α,ω-functional linear oligosiloxane of formula (III) in an OH-functional solvent with a solids content of at least 40 wt. % by the sol-gel process and in a second process step homogeneously stirring the polycondensation product produced in the first process step with components (I) and (IV) and optionally an additional amount of component (III) and optionally component (V).

10. An inorganic or organic material coated with the coating composition of claim 1.

11. A non-stick layer produced by applying the coating composition of claim 1 onto an inorganic or organic material or object to protect against dirt, graffiti or marine vegetation.

12. The non-stick layer of claim 11 wherein said inorganic or organic material or object comprises a surface of a building, a large vehicle or a rail vehicle.

* * * * *